(12) United States Patent
Schulz et al.

(10) Patent No.: US 12,592,646 B2
(45) Date of Patent: Mar. 31, 2026

(54) SYSTEMS AND METHODS FOR HEATING AN ELECTRIC CHARGER FOR ELECTRIC VEHICLE

(71) Applicant: RIVIAN IP HOLDINGS, LLC, Irvine, CA (US)

(72) Inventors: Steven Schulz, Torrance, CA (US); Zahra Mohajerani, Los Angeles, CA (US); Tyler Erikson, Torrance, CA (US); Silva Hiti, Redondo Beach, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 980 days.

(21) Appl. No.: 17/825,713

(22) Filed: May 26, 2022

(65) Prior Publication Data

US 2023/0387812 A1 Nov. 30, 2023

(51) Int. Cl.
| | |
|---|---|
| *H02J 7/00* | (2006.01) |
| *B60L 53/30* | (2019.01) |
| *B60L 53/60* | (2019.01) |
| *H02M 3/335* | (2006.01) |
| *H02M 7/06* | (2006.01) |
| *H05B 3/00* | (2006.01) |
| *H02M 1/42* | (2007.01) |

(52) U.S. Cl.
CPC ......... *H02M 3/33573* (2021.05); *B60L 53/30* (2019.02); *B60L 53/60* (2019.02); *H02J 7/007* (2013.01); *H02M 3/33584* (2013.01); *H02M 7/06* (2013.01); *H05B 3/0014* (2013.01); *H02J 2207/20* (2020.01); *H02M 1/4208* (2013.01)

(58) Field of Classification Search
USPC ........................................................ 320/109
See application file for complete search history.

(56) References Cited

U.S. PATENT DOCUMENTS

| | | | |
|---|---|---|---|
| 11,127,993 B2 | 9/2021 | King | |
| 2018/0334049 A1* | 11/2018 | Götz ................... | H01M 10/663 |
| 2022/0399819 A1 | 12/2022 | Mohan et al. | |
| 2023/0064783 A1 | 3/2023 | Zou et al. | |
| 2023/0066489 A1 | 3/2023 | Zou et al. | |

OTHER PUBLICATIONS

CN-214874277-U , 2014 (Year: 2014).*
Bullis, K., "Electric Vehicles Out in the Cold", MIT Technology Review, retrieved from https://www.technologyreview.com/2013/12/13/175150/electric-vehicles-out-in-the-cold/, Dec. 13, 2013, 7 pages.
Jenkins, J., et al., "A closer look at humidity control methods for EV electronics", Charged Electric Vehicles Magazine, retrieved from https://chargedevs.com/features/a-closer-look-at-humidity-control-methods-for-ev-electronics/, Jul. 29, 2021, 5 pages.

* cited by examiner

*Primary Examiner* — Samuel Berhanu
(74) *Attorney, Agent, or Firm* — HG LAW LLP

(57) ABSTRACT

Systems and methods for controlling a dual active bridge converter are disclosed herein. An environmental condition associated with an electric charger for an electric vehicle may be determined, where the electric charger comprises a dual active bridge converter. Based on the environmental condition associated with the electric charger, the dual active bridge converter may be caused to enter a heat generation mode that causes the dual active bridge converter to generate heat to ameliorate the environmental condition associated with the electric charger.

20 Claims, 10 Drawing Sheets

SYSTEMS AND METHODS FOR HEATING AN ELECTRIC CHARGER FOR ELECTRIC VEHICLE

INTRODUCTION

The present disclosure relates to one or more converters of a power cabinet, and, more particularly, to systems, apparatuses and related processes for controlling the one or more converters to enter a heat generation mode to ameliorate an environmental condition of the power cabinet.

SUMMARY

Dual active bridge converters are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. Electric chargers of such an electric vehicle charging station often need to be installed outdoors in potentially harsh weather conditions, and need to be designed to withstand extreme weather conditions (e.g., very cold temperatures).

The present disclosure provides systems and methods for improved heat generation in an electric charger for an electric vehicle, in order to maintain environmental conditions (e.g., to prevent condensation) associated with the electric charger without employing a separate heater element in the electric charger. The provided systems and methods may be configured to determine an environmental condition associated with the electric charger for the electric vehicle, wherein the electric charger comprises a dual active bridge converter, and based on the environmental condition associated with the electric charger, cause the dual active bridge converter to enter a heat generation mode that causes the dual active bridge converter to generate heat to ameliorate the environmental condition associated with the electric charger. In some embodiments, the dual active bridge converter may further be caused to exit the heat generation mode, e.g., upon determining that the environmental condition has been ameliorated.

In some embodiments, the environmental condition comprises a temperature associated with the electric charger. Control circuitry may cause the dual active bridge converter to enter the heat generation mode based on the environmental condition associated with the electric charger by determining that the temperature associated with the electric charger is below a threshold temperature. The control circuitry may cause the dual active bridge converter to exit the heat generation mode by determining the temperature associated with the electric charger has increased to a particular temperature value greater than the threshold temperature.

In some embodiments, the environmental condition comprises a humidity associated with the electric charger. The control circuitry may cause the dual active bridge converter to enter the heat generation mode based on the environmental condition associated with the electric charger by determining that the humidity associated with the electric charger is above a threshold humidity. The control circuitry may cause the dual active bridge converter to exit the heat generation mode by determining the humidity associated with the electric charger has decreased to a particular humidity value lower than the threshold humidity.

In some embodiments, the dual active bridge converter comprises a transformer, a primary side bridge comprising a first plurality of switches, and a secondary side bridge comprising a second plurality of switches.

In some embodiments, the control circuitry may cause the dual active bridge converter to enter the heat generation mode by creating a shorted output by turning on each of the second plurality of switches of the secondary side bridge, and controlling a current flowing through the primary side bridge and the transformer based on performing phase shift control of the first plurality of switches of the primary side bridge.

In some embodiments, the control circuitry may cause the dual active bridge converter to enter the heat generation mode by creating a shorted output by turning on a subset of the second plurality of switches corresponding to upper switches of the secondary side bridge or by turning on a subset of the second plurality of switches corresponding to lower switches of the secondary side bridge, and causing a current to flow through the primary side bridge and the transformer based on performing phase shift control of the first plurality of switches of the primary side bridge.

In some embodiments, in the heat generation mode, the dual active bridge converter is in a no-load operational state, and causing the dual active bridge converter to enter the heat generation mode comprises by periodically charging and discharging a capacitor coupled to the secondary side bridge to cause energy to be stored by and released from the capacitor.

In some embodiments, the dual active bridge converter may be caused to enter the heat generation mode when no electric vehicles are being charged by the electric charger. Alternatively, the dual active bridge converter may be caused to enter the heat generation mode when at least the electric vehicle is being charged by the electric charger.

In some embodiments, the provided systems and methods may be configured to comprise a first bidirectional converter capable of bidirectional power flow and a second bidirectional converter capable of bidirectional power flow. The control circuitry may be configured to determine an environmental condition associated with an electric charger for an electric vehicle, wherein the electric charger comprises the first bidirectional converter and the second bidirectional converter. Based on the environmental condition associated with the electric charger, the control circuitry may cause the first bidirectional converter and the second bidirectional converter to enter a heat generation mode. Such heat generation mode may cause the first bidirectional converter and the second bidirectional converter to generate heat to ameliorate the environmental condition associated with the electric charger by causing current to circulate between the first bidirectional converter and the second bidirectional converter.

In some embodiments, at least one of the first bidirectional converter or the second bidirectional converter is a dual active bridge DC-DC converter. In some embodiments, the control circuitry may further cause the first bidirectional converter and the second bidirectional converter to exit the heat generation mode, e.g., upon determining that the environmental condition has been ameliorated.

In some embodiments, the system further comprises a first power electronics module and a second power electronics module, and each of the first bidirectional converter and the second bidirectional converter is a DC-DC converter. The first power electronics module may comprise the first bidirectional converter and a first AC-DC converter, and the second power electronics module may comprise the second bidirectional converter and a second AC-DC converter, where each of the first AC-DC converter and the second AC-DC converter may be capable of bidirectional power flow. Each of the first bidirectional converter and the first AC-DC converter may be coupled to a first DC link, and each of the second bidirectional converter and the second AC-DC converter may be coupled to a second DC link distinct from the first DC link.

In some embodiments, the first bidirectional converter is an AC-DC converter, the second bidirectional converter is an AC-DC converter, and each of the first bidirectional converter and the second bidirectional converter may be coupled to a common DC link and an AC source.

In some embodiments, the first bidirectional converter is an DC-DC converter, the second bidirectional converter is an DC-DC converter, and each of the first bidirectional converter and the second bidirectional converter is coupled to a common DC link.

In some embodiments, the system further comprises a first power electronics module comprising the first bidirectional converter and a second power electronics module comprising the second bidirectional converter, where the first power electronics module and the second power electronics module are connected in parallel. The first power electronics module may be configured to be a master power electronics module that controls an output of the parallel connection, and the second power electronics module may be configured to be a slave power electronics module configured to draw a current from the output and return the current to an electrical power grid. The first power electronics module may be configured to control the output of the parallel connection by generating an equal and opposite output current to the current drawn by the second power electronics module.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
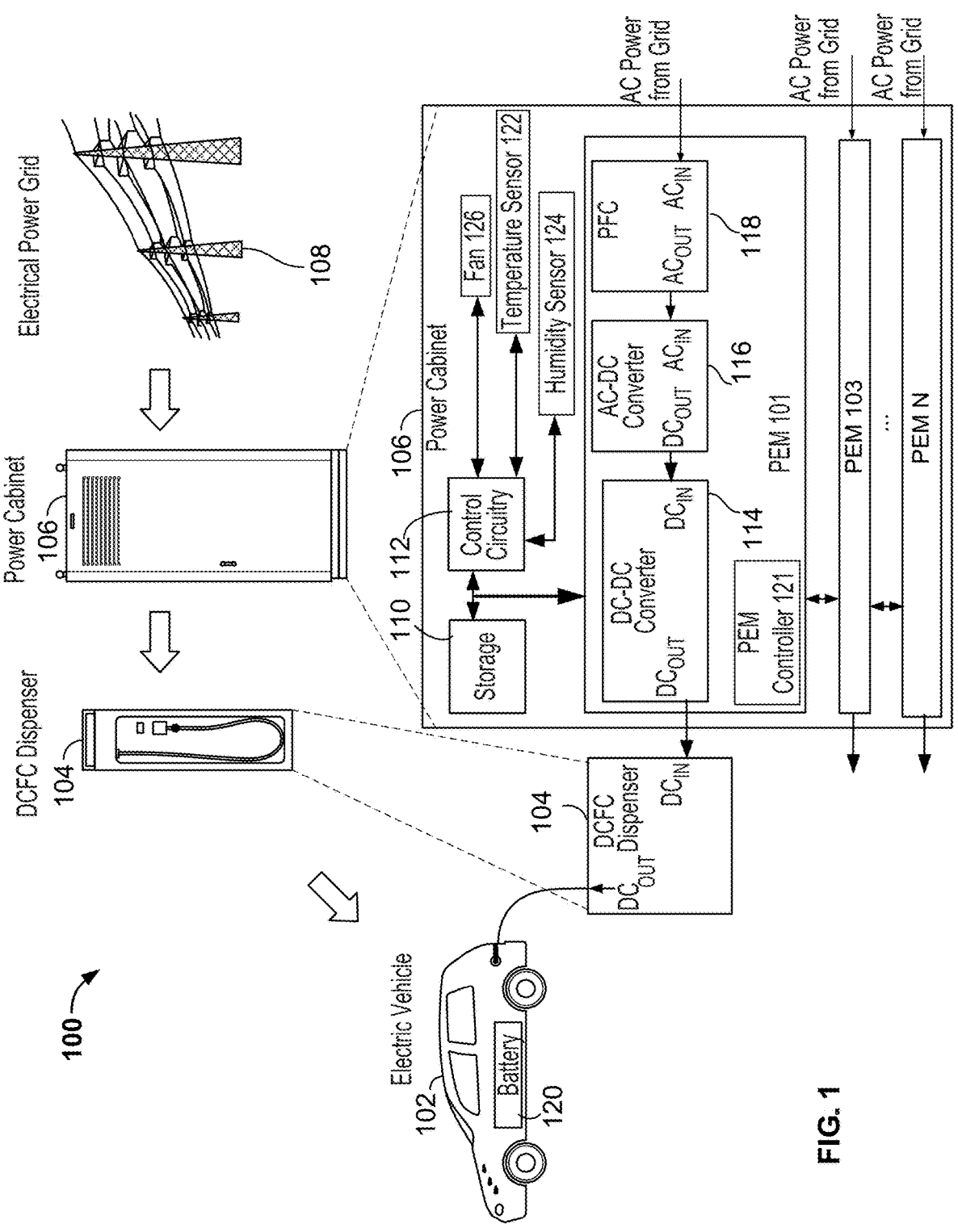
FIG. 1 shows an illustrative block diagram of an electric vehicle charging system including a dual active bridge converter, in accordance with some embodiments of the disclosure.

FIG. 1 shows an illustrative block diagram of an electric vehicle charging system 100, in accordance with some embodiments of the disclosure. System 100 includes one or more electric vehicles 102, one or more direct current fast charger (DCFC) dispensers 104, one or more power cabinets 106, and electrical power grid 108. In some embodiments, electric vehicle charging system 100 may comprise one or more electric chargers for electric vehicles 102, where each electric charger may comprise at least a portion of power cabinet 106 and/or at least a portion of DCFC dispenser 104 and/or any other suitable components. Electric vehicle 102 includes rechargeable battery 120. Power cabinet 106 includes storage 110 and control circuitry 112 and one or more (e.g., 5 or 6 or any other suitable number) power electronics modules (PEMs) 101, 103 . . . N. In some embodiments, control circuitry 112 may be a master controller configured to control operation of each PEM, e.g., to transmit control signals to control an output of each PEM, based on one or more inputs.

In some embodiments, each PEM 101, 103, . . . N may include DC-DC converter 114, AC-DC converter 116, power factor correction (PFC) circuitry 118, and PEM controller 121. In some embodiments, DC-DC converter 114 may be a dual active bridge (DAB) DC-DC converter, a CLLC DC-DC converter, or any other suitable type of DC-DC converter, or any combination thereof. In some embodiments, the functionality provided by PFC circuitry 118 may alternatively be performed by AC-DC converter 116. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. PFC circuitry 118 performs power factor correction upon the AC electrical power received from electrical power grid 108, and outputs a power factor corrected AC power signal to AC-DC converter 116. AC-DC converter 116 converts the power factor corrected AC power signal received from PFC circuitry 118 into a DC signal, such as, for example, a signal fixed at a voltage in a range from 800 to 1000 V and a maximum power of approximately 50 kilowatts (kW). AC-DC converter 116 provides the DC signal to DC-DC converter 114, which converts the received DC signal into an output DC signal that is provided, by way of DCFC dispenser 104, to charge battery 120 via a charging port of electric vehicle 102. For example, DC-DC converter 114 may be configured to step up or step down the DC signal received from AC-DC converter 116, to a voltage that is suitable for battery 120. In some embodiments, multiple PEMs may be connected in parallel to increase the power level to 300 kW, for example, or any other suitable power level.

In some embodiments, each PEM of power cabinet 106 may be coupled to a DCFC dispenser 104 to enable the providing of power to charging ports of respective electric vehicles. In some embodiments, power cabinet 106, and/or each PEM, may include one or more of temperature sensor 122 (e.g., a thermistor, a thermocouple, a thermopile, a resistance temperature detector, and infrared optical detector or any other suitable sensor or any combination thereof) to measure a temperature associated with (e.g., within and/or in a vicinity of) power cabinet 106 and/or a temperature associated with (e.g., within and/or in a vicinity of) a particular PEM. In some embodiments, power cabinet 106, and/or each PEM, may include one or more of humidity sensor 124 which may be configured to sense a current humidity level associated with (e.g., within and/or in a vicinity of) power cabinet 106 and/or a humidity associated with (e.g., within and/or in a vicinity of) a particular PEM. Humidity sensor 124 may correspond to any suitable sensor or device configured to measure an absolute humidity, the amount of water vapor in the ambient air of power cabinet 106, and/or a relative humidity, the amount of water vapor or moisture in the ambient air of power cabinet 106 expressed as a fraction or percentage of a maximum humidity at a given temperature, and/or a specific humidity. In some embodiments, power cabinet 106, and/or each PEM, may include fan 126 or any suitable blower or other heating, ventilation, and air conditioning (HVAC) component usable to circulate and/or dehumidify the air within power cabinet 106, and/or within a particular PEM. In some embodiments, humidity sensor 124 may be capacitive-based, resistive-based, thermal-based, or may be of any other suitable type, or any combination thereof. In some embodiments, power cabinet 106, and/or each PEM, may include current sensors (e.g., a current loop or other transformer, a precision resistor), voltage sensors, optical sensors, any other suitable sensors, or any combination thereof.

Each DCFC dispenser 104 may correspond to one or more towers having one or more charging cords emanating therefrom, and the charging chords may comprise plugs used to establish an electrical connection between one of the electric chargers and vehicle 102 in order to charge a battery of vehicle 102. In some embodiments, the electric charging station comprising power cabinet 106 may correspond to a particular address or location, such as, for example, a parking lot or other designated area having one or more electric chargers available for use. In some embodiments, system 100 may comprise or be in communication with one or more servers which may include and/or maintain and/or be in communication with one or more databases. The elements of system 100 may be configured to communicate using any suitable wired or wireless technique, e.g., Bluetooth low energy (BLE) or near-field communication (NFC), the Internet, a local area network, a wide area network, a satellite network, a cellular network, etc., and/or any other suitable technique. Vehicle 102 may be a car (e.g., a coupe, a sedan, a truck, a delivery vehicle, an SUV, a bus, or any other suitable type of car, or any combination thereof), a motorcycle, an aircraft (e.g., a drone, or any other suitable type of aircraft), a watercraft (e.g., a boat or any other suitable type of watercraft), or any other suitable type of vehicle, or any combination thereof. In some embodiments, vehicle 102 may be configured to operate autonomously or semi-autonomously.

In some embodiments, electric vehicle 102 may be plugged, or otherwise connected to, DCFC dispenser 104 via a cable (e.g., having a SAE J1772 charging plug, a combined charging system (CCS) compatible connector, etc.), having more than one conductor of suitable gauge. Such cable may include conductors for carrying charging current and/or conductors for transmitting information. It will be understood that any suitable arrangement of leads may be used in accordance with the present disclosure. In some embodiments, the electric charging station comprising power cabinet 106 may be a DC station (e.g., including a DC fast electric charger, such as, for example, a 26-100 kW DC Fast charger or a 101-350 kW DC Fast charger) or including any other suitable type of electric charger, or any combination thereof.

Control circuitry 112 and/or PEM controller 121 may comprise a processor and memory (e.g., storage 110), and the processor may comprise a hardware processor, a software processor (e.g., a processor emulated using a virtual machine), or any combination thereof. Control circuitry 112 and/or PEM controller 121 may communicatively connected to components of one or more power cabinets 106 and/or DCFC dispenser 104 or any other suitable element of system 100. Control circuitry 112 and/or PEM controller 121 may comprise one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. Control circuitry 112 and/or PEM controller 121 may monitor sensor signals, generate control signals, execute computer readable instructions, receive inputs, perform any other suitable actions, or any combination thereof.

Storage 110 may comprise hardware elements for non-transitory storage of commands or instructions, that, when executed by control circuitry 112, cause system 100 to operate in accordance with the embodiments described above and below. Storage 110 may include any suitable storage device such as, for example, volatile memory, non-volatile memory, a removable storage device, a solid-state storage device, an optical device, a magnetic device, any other suitable component, or any combination thereof, for storing information. Power cabinet 106 may comprise communications circuitry (e.g., a wired and/or wireless network transceiver) which may comprise any suitable hardware and/or software operable to send and receive wired and/or wireless signals to or from any suitable networked or other device. The communications circuitry may include an antenna and other control circuitry (e.g., protocol converters, rate converters, signal converters), or any combination thereof.

Figure 2:
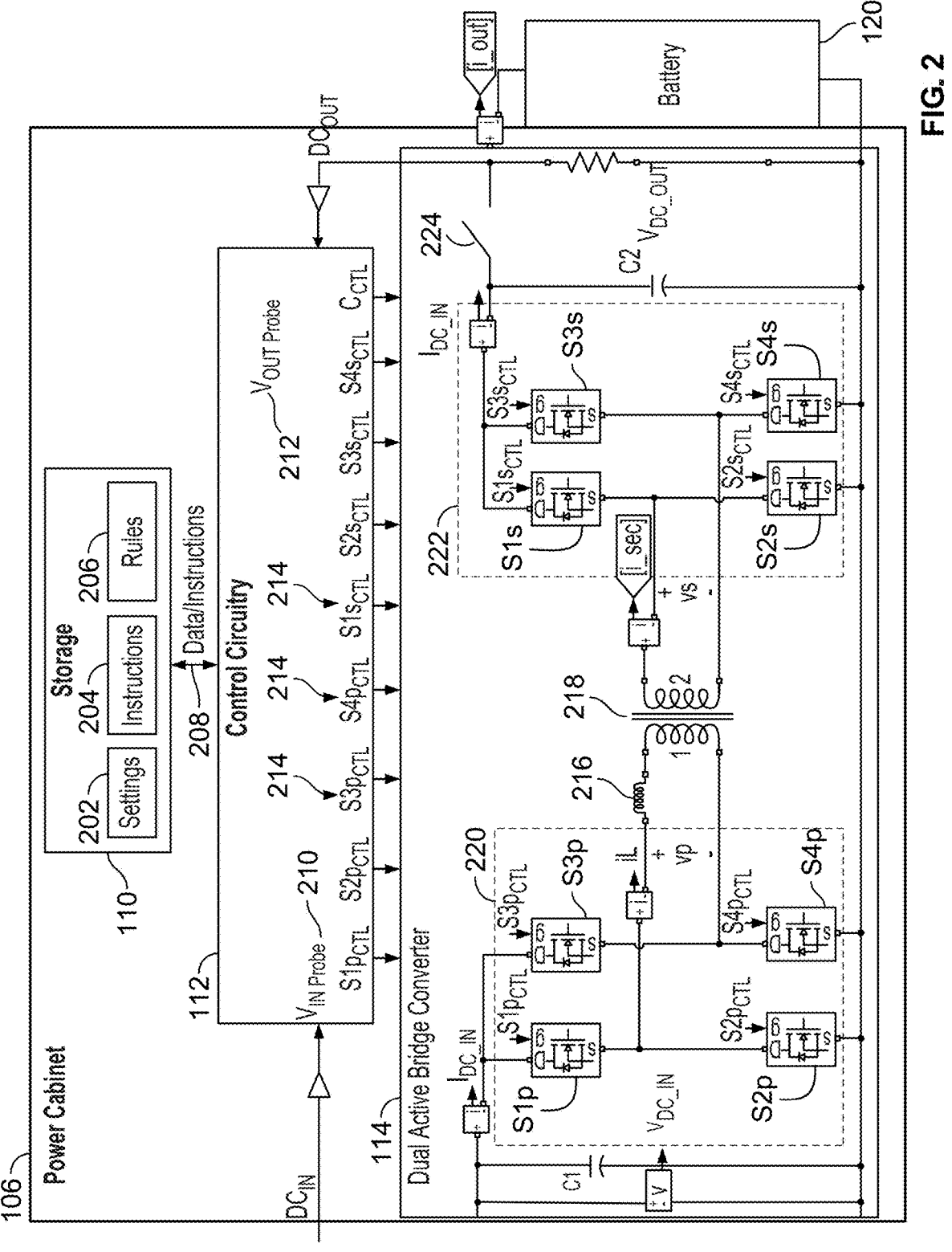
FIG. 2 is an illustrative block diagram showing additional details of some components of a power cabinet, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, actions performed by control circuitry 112 may be based on instructions received from the application. For example, the application may be implemented as software or a set of executable instructions that may be stored in storage 110 and executed by control circuitry 112.

DC-DC converter 114 includes transformer 218, a primary side bridge 220 and a secondary side bridge 222. Primary side bridge 220 is coupled to a primary side of transformer 218 via inductor 216. Transformer 218 may comprise mutual inductors, e.g., coils wound around a magnetic material, in which a primary side winding may be placed close to a secondary side winding. Secondary side bridge 222 is coupled to a secondary side of transformer 218. As used herein, the "primary side" of DC-DC converter 114 refers to the portion of DC-DC converter 114 appearing to the left of transformer 218 in FIG. 2, and the "secondary side" of DC-DC converter 114 refers to the portion of DC-DC converter 114 appearing to the right of transformer 218 in FIG. 2. As used herein, Vp and Vs refer to the voltage on the primary side of transformer 218 and the voltage on the secondary side of transformer 218, respectively. DC-DC converter 114 may include primary side switches S1$p$, S2$p$, S3$p$, and S4$p$ located on the primary side of DC-DC converter 114 and secondary side switches S1$s$, S2$s$, S3$s$, and S4$s$ located on the secondary side of DC-DC converter 114. Switches S1$p$, S2$p$, S3$p$, S4$p$, S1$s$, S2$s$, S3$s$, and S4$s$ may be any suitable type of electronic switch, such as a field effect transistor (FET)-based switch and/or a bipolar junction transistor (BJT)-based switch and/or diodes and/or any other suitable switch. Such switches can be switched on/closed (e.g., during which current is permitted to be conducted between its source and drain terminal) or off/open (e.g., during which current is effectively prevented from being conducted between its source and drain terminal) by changing a logic level of the control signal provided to its gate terminal, for example from a logic-high to a logic-low. Primary side bridge 220 and secondary side bridge 222 may include or otherwise be coupled to any suitable number of, and/or types of, components, e.g., one or more rectifiers, diodes, oscillators, resistors, switches, transistors, capacitors, current sources, voltage sources, inductors, and/or any other suitable components.

Control circuitry 112 may include storage interface port 208, first input port 210 (VIN Probe), second input port 212 (VOUT Probe), and multiple output ports 214. Control circuitry 112 may be configured to transmit and receive instructions, settings, rules, and/or other types of data to and from storage 110 via storage interface port 208. Control circuitry 112 is configured to sense an input voltage (VIN) of DC-DC converter 114 via first input port 210. Control circuitry 112 is configured to sense an output voltage (VO) of DC-DC converter 114 via second input port 212 (VOUT Probe).

Output ports 214 include primary switching control ports S1$p$CTL, S2$p$CTL, S3$p$CTL, and S4$p$CTL, by which control circuitry 112 provides respective switching control signals to respective switching control ports S1$p$CTL, S2$p$CTL, S3$p$CTL, and S4$p$CTL of primary side switches S1$p$, S2$p$, S3$p$, and S4$p$. Output ports 214 also include secondary switching control ports S1$s$CTL, S2$s$CTL, S3$s$CTL, and S4$s$CTL, by which control circuitry 112 provides respective switching control signals to respective switching control ports S1$s$CTL, S2$s$CTL, S3$s$CTL, and S4$s$CTL of secondary side switches S1$s$, S2$s$, S3$s$, and S4$s$, respectively. Complete signal paths from switching control ports S1$p$CTL, S2$p$CTL, S3$p$CTL, S4$p$CTL, S1$s$CTL, S2$s$CTL, S3$s$CTL, and S4$s$CTL of control circuitry 112 to S1$p$CTL, S2$p$CTL, S3$p$CTL, S4$p$CTL, S1$s$CTL, S2$s$CTL, S3$s$CTL, and S4$s$CTL of DC-DC converter 114 are omitted from FIG. 2 for clarity. Nonetheless, switching control ports S1$p$CTL, S2$p$CTL, S3$p$CTL, S4$p$CTL, S1sCTL, S2$s$CTL, S3$s$CTL, and S4$s$CTL of control circuitry 112 are indeed coupled to S1$p$CTL, S2$p$CTL, S3$p$CTL, S4$p$CTL, S1$s$CTL, S2$s$CTL, S3$s$CTL, and S4$s$CTL of DC-DC converter 114 via respective signal paths. In some embodiments, DC-DC converter 114 may include contactor 224, which may be an electronic switch or relay configured to connect (when closed) the load (e.g., battery 120) to DC-DC converter 114 and disconnect (when open) the load from DC-DC converter 114. Output ports 214 may include C$_{CTL}$ by which control circuitry 112 provides switching control signals to contactor 224. While a complete switching path from control port C$_{CTL}$ to contactor 224 is omitted from FIG. 2 for clarity, switching control port C$_{CTL}$ is indeed coupled to contactor 224 via a signal path.

Figure 7A:
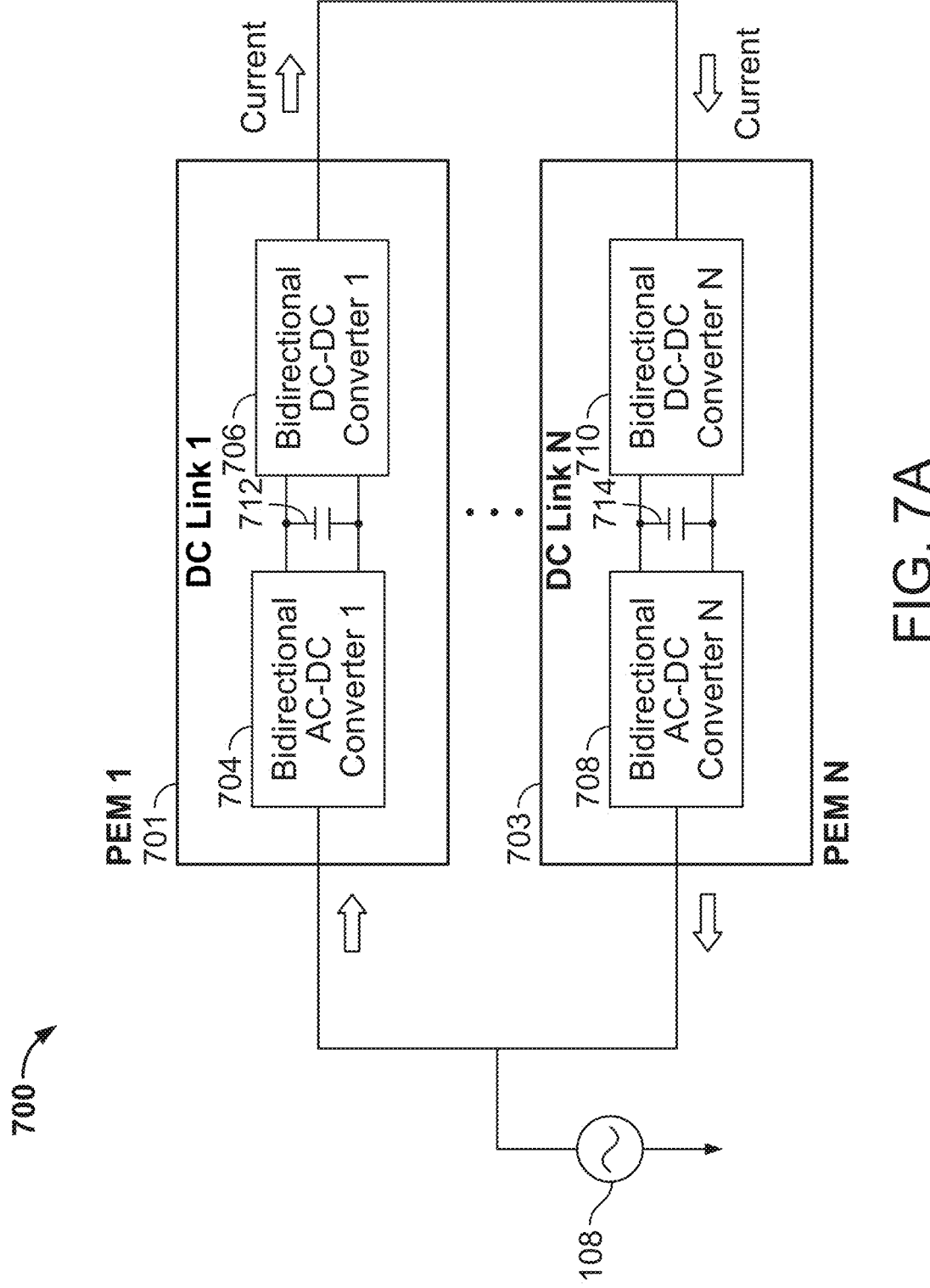
FIGS. 7A-7C are illustrative block diagrams showing additional details of some components of a power cabinet, in accordance with some embodiments of the disclosure.
Figure 7B:
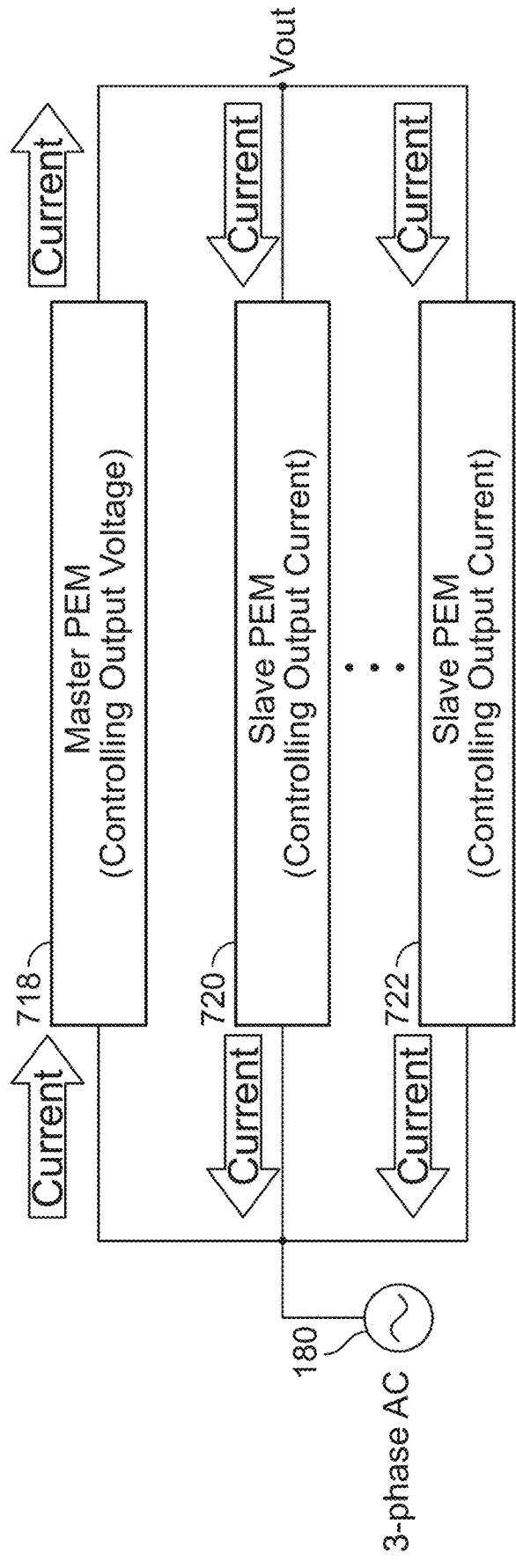
Figure 7C:
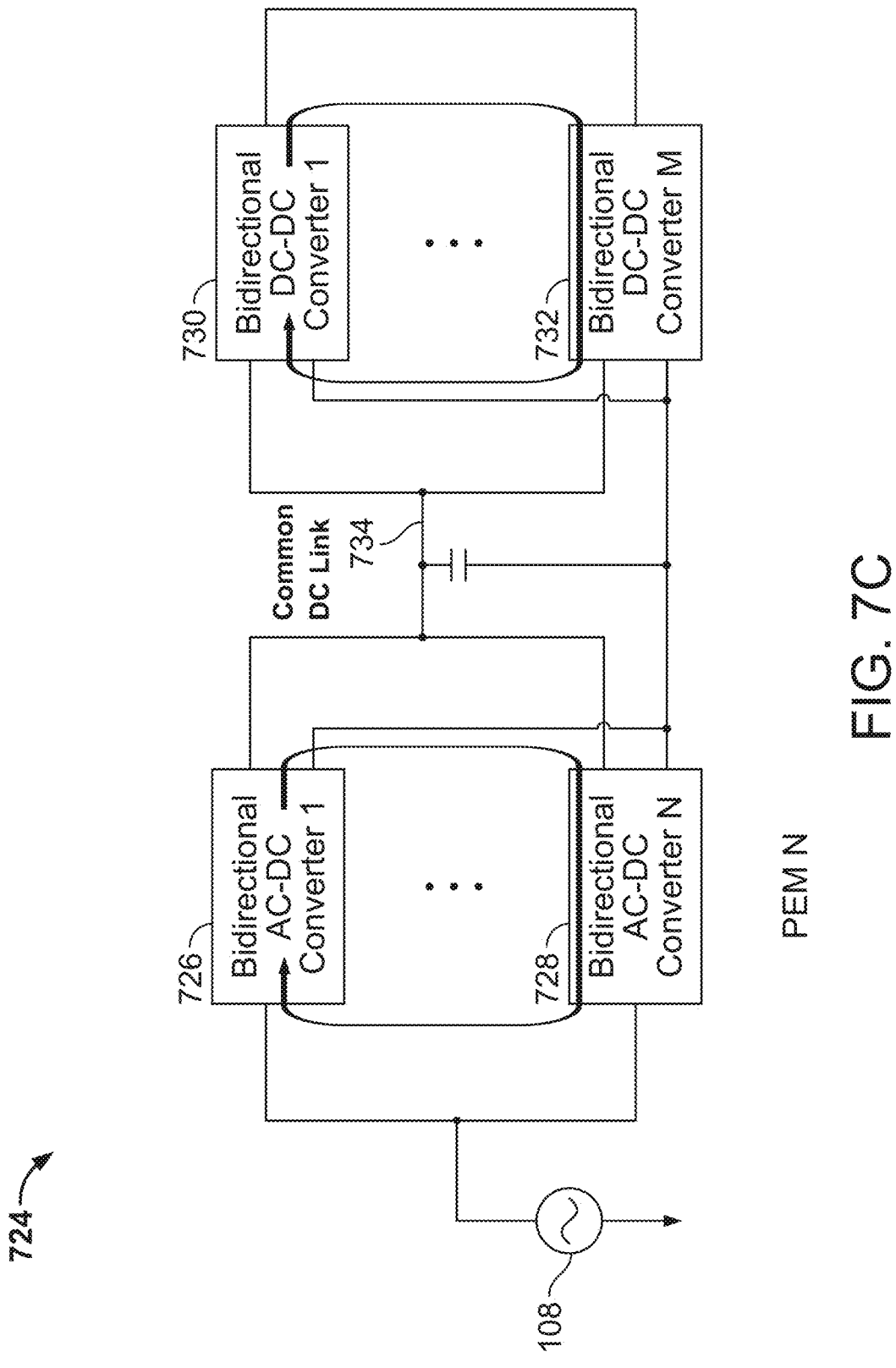

As described in further detail below, in some aspects, control circuitry 112 and/or PEM controller 121 may be configured to generate losses in power cabinet 106 comprising one or more PEMs in order to maintain environmental conditions (e.g., to prevent condensation) associated with, or ameliorate environmental conditions associated with, one or more of power cabinet 106 using one or more of a variety of techniques. The system may be configured to intelligently operate switches to induce a predictable amount of losses and heat, and such aspects may increase the resiliency of system 100 in, e.g., low or very low temperatures, as well as increase the lifetime and robustness of system 100, e.g., by controlling a minimum temperature of the system. In some embodiments, DC-DC converter 114 may be configured to enter a heat generation mode to create such losses. For example, control circuitry 112 and/or PEM controller 121 may be configured to cause DC-DC converter 114 to enter the heat generation mode by creating a shorted output (e.g., by turning on each of S1$s$, S2$s$, S3$s$, and S4$s$ of secondary side bridge 222; or by turning on only upper switches S1$s$ and S2$s$, or only lower switches S3$s$ and S4$s$, from among S1$s$, S2$s$, S3$s$, and S4$s$ of secondary side bridge 222). In some embodiments, control circuitry 112 and/or PEM controller 121 may cause DC-DC converter 114 (in a no-load operational state) to enter the heat generation mode by periodically charging and discharging capacitor C2 coupled to secondary side bridge 222 to cause energy to be stored and released from the capacitor C2. In some embodiments, such no-load operational state may correspond to switches S1$s$, S2$s$, S3$s$, and S4$s$ of secondary side bridge 222 being operated using pulse-width modulation (PWM). As yet another example, control circuitry 112 and/or PEM controller 121 may cause DC-DC converter 114 (in a no-load operational state) to enter the heat generation mode by causing current to circulate between bidirectional converters (e.g., DC-DC converters and/or AC-DC converters), as shown in FIGS. 7A-7C.

In determining whether to enter the heat generation mode, control circuitry 112 and/or PEM controller 121 may determine an environmental condition of power cabinet 106. For example, such environmental condition may correspond to an interior ambient temperature of power cabinet 106 and/or a particular PEM 101, and may be determined based on a signal received from temperature sensor 122. As another example, the environmental condition may correspond to a humidity reading associated with power cabinet 106 and/or a particular PEM 101, and may be determined based on a signal received from humidity sensor 124. In some embodiments, control circuitry 112 and/or PEM controller 121 may determine to monitor the environmental condition in response to determining that power cabinet 106 and/or DCFC dispenser 104 is in a standby mode in which no electric vehicles are being charged. Additionally or alternatively, control circuitry 112 and/or PEM controller 121 may determine to monitor the environmental condition in response to determining that power cabinet 106 and/or DCFC dispenser 104 is in a charging mode in which at least one electric vehicle is being charged.

In some embodiments, control circuitry 112 and/or PEM controller 121 may compare the determined environmental condition (e.g., temperature value and/or humidity reading and/or any other suitable measurement or environmental state) to a threshold stored at storage 110, e.g., in association with settings 202, instructions 204, and/or rules 206 of storage 110. For example, storage 110 may store a threshold temperature value (e.g., –20 degrees Celsius and/or any other suitable value(s)) and/or a threshold humidity value (e.g., 90% and/or any other suitable value(s)) to which the current environmental condition should be compared. As an example, upon determining the ambient temperature of power cabinet 106 and/or a particular PEM is below the threshold of –20 degrees Celsius, control circuitry 112 may cause the heat generation mode to be employed until control circuitry 112 determines that the ambient temperature of power cabinet 106 and/or a particular PEM has increased above the threshold temperature or has increased to a particular stored temperature value (e.g., –10 degrees Celsius or any other suitable value). As another example, upon determining the relative humidity of power cabinet 106 and/or a particular PEM is above 90%, control circuitry 112 may cause the heat generation mode to be employed (e.g., including causing fan 126 to be turned on) until control circuitry 112 determines that the relative humidity of power cabinet 106 and/or a particular PEM has decreased to be lower than the threshold or to a particular stored value (e.g., 80%) that is lower than the threshold by a specified amount. In some embodiments, upon determining, based on a sensor reading or other indicator, that a door or cover of power cabinet 106 and/or DCFC dispenser 104 is open and exposed to the outside environment, control circuitry 112 may decline to activate the heat generation mode even if the environmental conditions otherwise indicate that the heat generation mode should be activated. In some embodiments, contactor 224 may be caused to be open while the heat generation mode is in an activated state. In some embodiments, the heat generation mode may be employed regardless of whether vehicle 102 is being charged at or otherwise connected to DCFC dispenser or another element of system 100, e.g., the heat generation mode can be implemented when vehicle 102 is being charged and when no vehicle is being charged via system 100.

In some embodiments, stored settings 202 may include power transfer settings, such as a maximum power transfer level for DC-DC converter 114; an effective or fundamental phase shift (V) predetermined to achieve a certain power transfer capability for DC-DC converter 114, a switching frequency for DC-DC converter 114, and/or other types of settings. In some embodiments, stored rules 206 may include computational constants (e.g., values of inductors and/or transformers of DC-DC converter 114), look-up-tables that specify certain environmental thresholds that trigger the heat generation mode and/or associated values of environmental conditions at which the heat generation mode may be deactivated and/or other types of information or data. In some aspects, instructions 204 are executed by control circuitry 112 to implement steps of various methods described herein.

In some embodiments, control circuitry 112 may cause DC-DC converter 114 to enter the heat generation mode by employing active heating of DC-DC converter 114 with a shorted output, e.g., creating an effective short circuit of secondary side bridge 222 by selectively enabling (and/or selectively disabling) specific switches of secondary side bridge 222. Such aspects may create a circulating current within at least one PEM 101, 103, . . . N to induce controlled conduction and/or switching losses, e.g., in power semiconductors (one or more transistors) and magnetics (one or more transformers and/or inductors) of DC-DC converter 114. For example, control circuitry 112 may cause (e.g., by transmitting respective control signals by way of S1sCTL, S2sCTL, S3sCTL, and S4sCTL) each of S1s, S2s, S3s, and S4s of secondary side bridge 222 to be turned on to create a shorted output. In some embodiments, such technique may be employed when no load is connected to secondary side bridge 222. As another example, control circuitry 112 may cause create a shorted output by causing either secondary side switches S1s and S2s, or secondary side switches S3s and S4s, to be turned on, which effectively shorts the secondary side of transformer 218. Such technique may be useful if the DC-DC converter 114 does not allow for, or a current state of DC-DC converter 114 (e.g., a lockout condition) does not allow for, each of S1s, S2s, S3s and S4s to be turned on at the same time.

Figure 3:
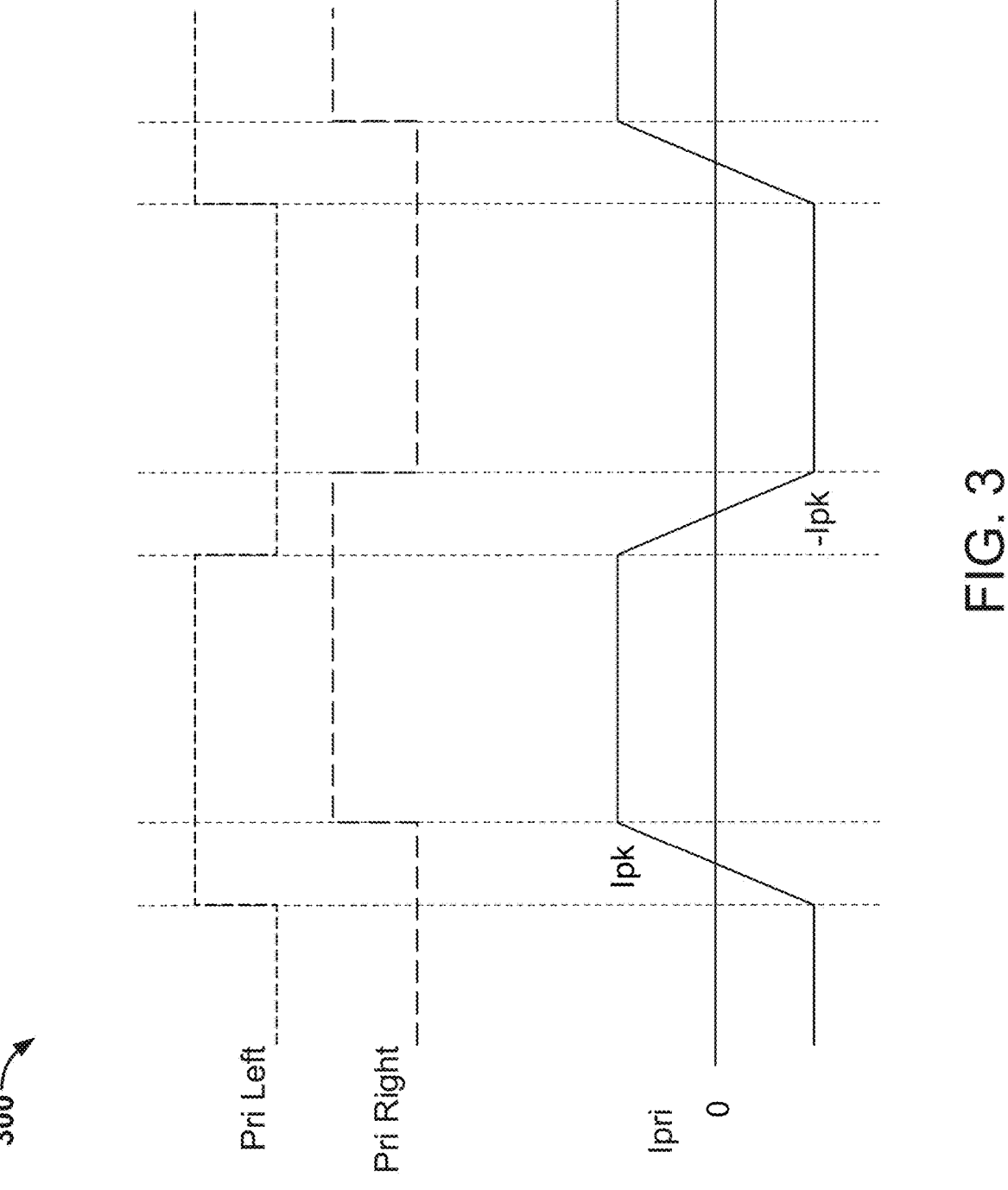
FIG. 3 depicts an illustrative timing diagram of phase shift control of primary side switches of a primary side bridge of a DC-DC converter, in accordance with some embodiments of the disclosure.

FIG. 3 depicts an illustrative timing diagram 300 of phase shift control of primary side switches of primary side bridge 220, in accordance with some embodiments of the disclosure. Control circuitry 112 may be configured to implement phase shift control of primary side switches S1p and S2p ("Pri Left"), and S3p and S4p ("Pri Right"), located on primary side bridge 220 of DC-DC converter 114, and such switching actions may generate square wave voltage waveforms that are out of phase relative to each other. For example, such switches may be operated with a predictable phase shift which results in a primary side current, flowing through inductor 216 and transformer 218, that ramps up to a certain value (Ipk) and ramps down to a certain value (–Ipk), and results in a voltage applied to transformer 218, to induce losses. In some embodiments, the current flowing through inductor 216 may correspond to an AC waveform of a trapezoidal shape. The intra-bridge phase shifting may be used to control the peak current, e.g., raising and lowering the peak current, to adjust and control an amount of loss generated, as needed. Such phase control operation may be implemented at a single PEM, or at any suitable number of PEMs 101, 103, . . . N, simultaneously, or sequentially by multiple PEMs. In some embodiments, each of the PEMs 101, 103, . . . N, (e.g., 6 or any other suitable number) in power cabinet 106 may be configured to generate a loss exceeding 1000 W.

Figure 4:
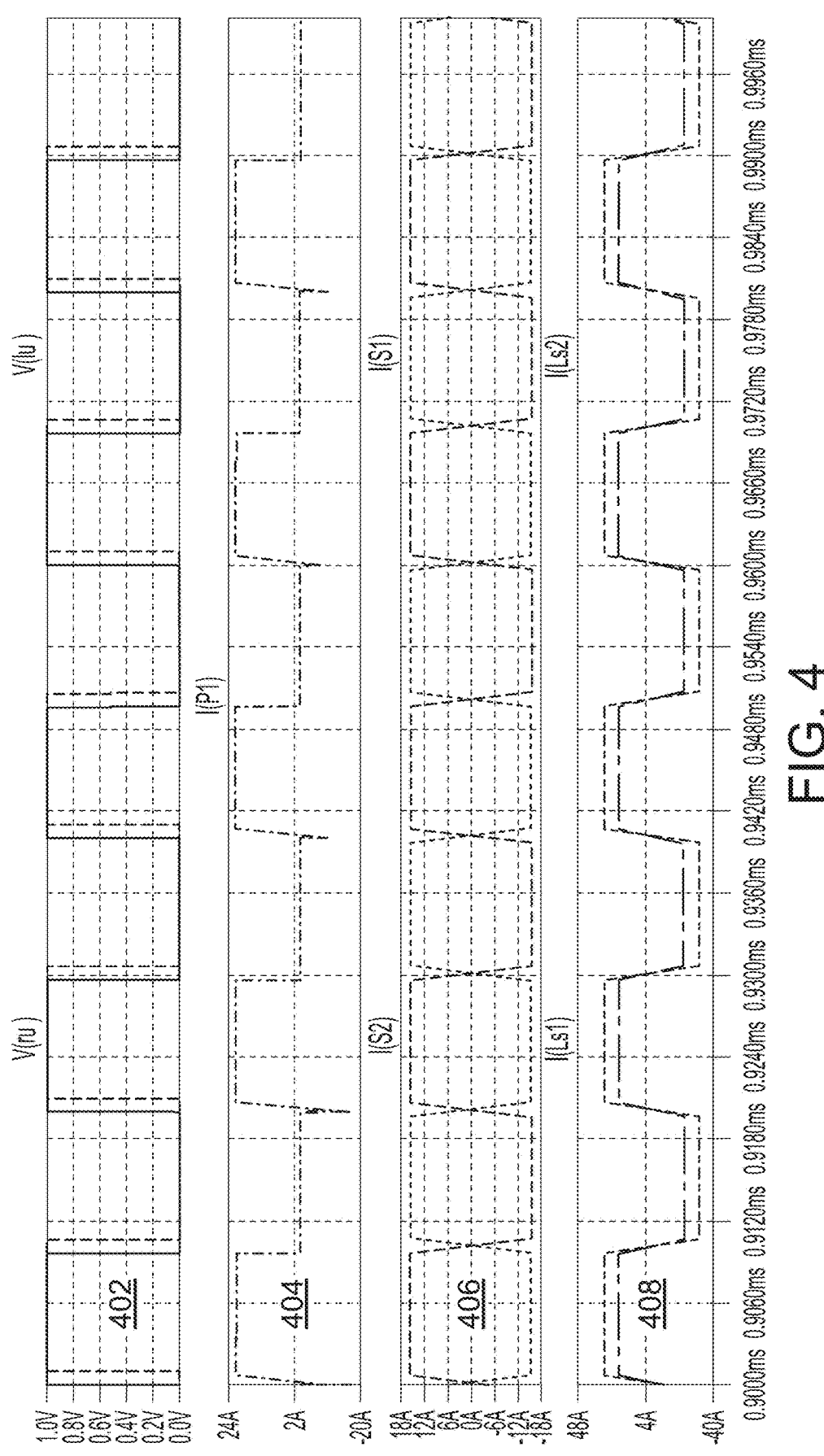
FIG. 4 depicts illustrative timing diagrams resulting from a heat generation mode of a DC-DC converter, in accordance with some embodiments of the disclosure.

FIG. 4 depicts illustrative timing diagrams resulting from a heat generation mode of DC-DC converter 114, in accordance with some embodiments of the disclosure. Diagram 402 represents voltage signals for the left (S1p and S2p) and right (S3p and S4p) switches of primary side bridge 220 during the heat generation mode of DC-DC converter 114. Diagram 404 represents primary side bridge 220 current during the heat generation mode of DC-DC converter 114. Diagram 406 represents secondary side bridge 222 current during the heat generation mode of DC-DC converter 114. Diagram 408 represents primary and secondary winding currents of transformer 218 during the heat generation mode of DC-DC converter 114. As discussed, during such heat generation mode of DC-DC converter 114, secondary side bridge 222 of DC-DC converter 114 may be effectively short circuited, e.g., all secondary switches may be turned on, and a primary side bridge 220 intra-bridge phase shift may control a peak current. In some embodiments, the current of secondary side bridge 222 may be equally split between upper switches S1s and S3s, and lower switches S2s and S4s. In some embodiments, primary side switches S1p, S2p, S3p, and S4p may have ~0.707 the primary current of primary side bridge 220. As a non-limiting example, with a 1 μs phase shift, the primary current of primary side bridge 220 may be 21.4 Apk, 20.5 Arms; the secondary current of secondary side bridge 222 may be 31.1 Apk, 29.8 Arms; one or more of primary side switches S1$p$, S2$p$, S3$p$, and S4$p$ may have a current value of 14.3 Arms; and one or more of secondary switches S1$s$, S2$s$, S3$s$, and S4$s$ may a current value of 14.9 Arms.

Figure 5A:
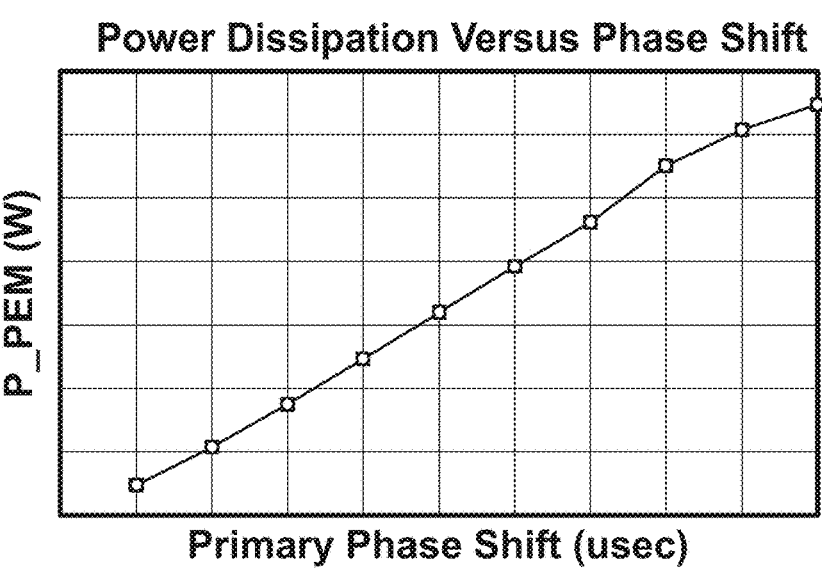
FIGS. 5A-5C depict illustrative graphs depicting the results of implementing a heat generation mode in a DC-DC converter, in accordance with some embodiments of the disclosure.
Figure 5B:
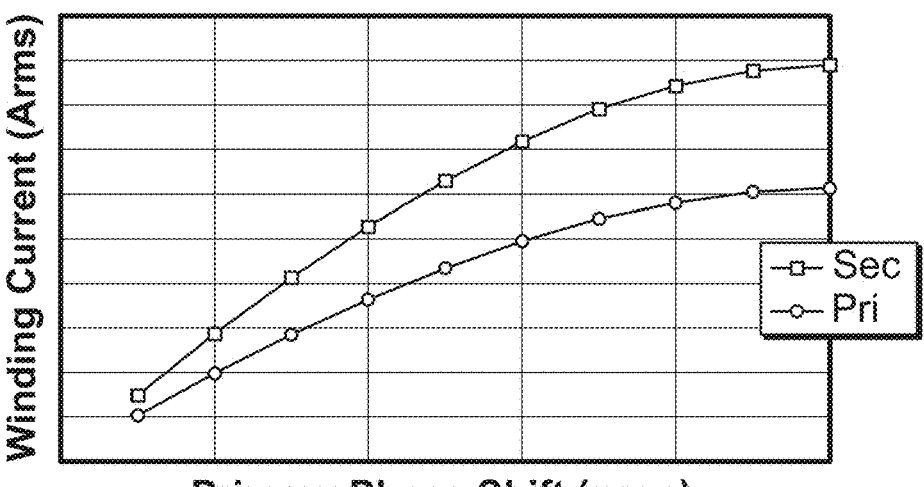
Figure 5C:
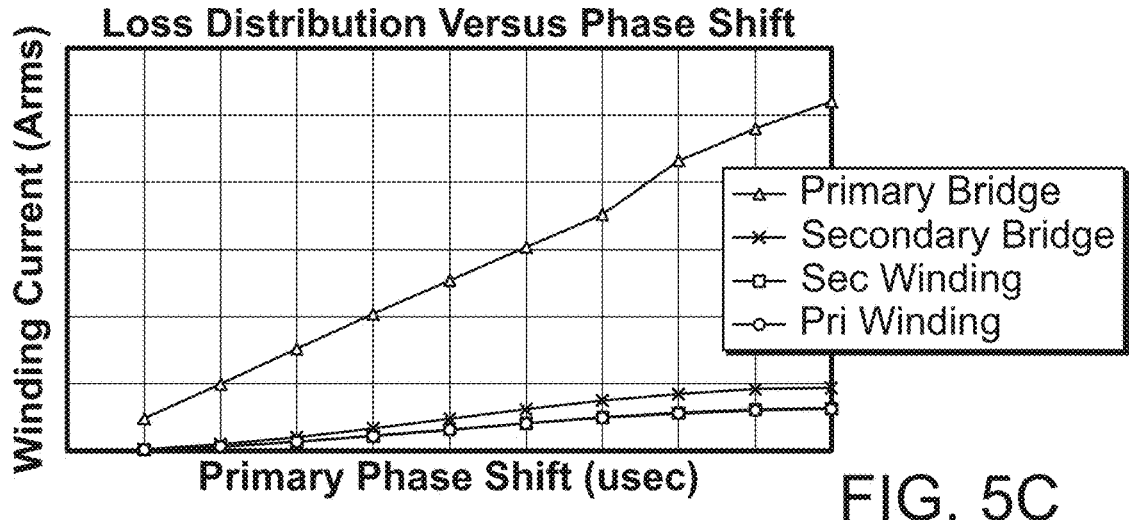

FIGS. 5A-5C depict illustrative graphs depicting the results of implementing a heat generation mode in a DC-DC converter, in accordance with some embodiments of the disclosure. FIG. 5A shows a graph of PEM power dissipation versus phase shift of one or more of primary side switches S1$p$, S2$p$, S3$p$, and S4$p$ as controlled by control circuitry 112. As shown, in some embodiments, the power loss may correspond to approximately 1.5 kW/PEM. In some embodiments, the power loss may be controlled to be limited to approximately a 1.0 kW/PEM heating capability, to prevent excessive heating due to the secondary current of secondary side bridge 222. In some embodiments, a bulk of losses may be generated by way of the primary power module switching. FIG. 5B shows a graph of winding current of transformer 208 versus phase shift of primary side switches of primary side bridge 220 during the heat generation mode, according to some embodiments FIG. 5C shows a graph of loss distribution versus phase shift of primary side switches of primary side bridge 220 during the heat generation mode, according to some embodiments.

In some embodiments, control circuitry 112 may cause DC-DC converter 114 to enter the heat generation mode by, when DC-DC converter 114 is in a no-load operational state, e.g., secondary side bridge 222 is not being shorted (and may be operating in PWM fashion, and contactor 224 may have isolated the PEM output from vehicle load), periodically charging and discharging capacitor C2 (or one or more of any other suitable energy-storage elements) coupled to secondary side bridge to 222 to cause energy to be stored by and released from capacitor C2 and/or the one or more other suitable energy-storage elements. Based on such energy, the product of power and time, the generated power losses may serve to heat one or more of the PEMs and/or power cabinet 106.

Figure 6:
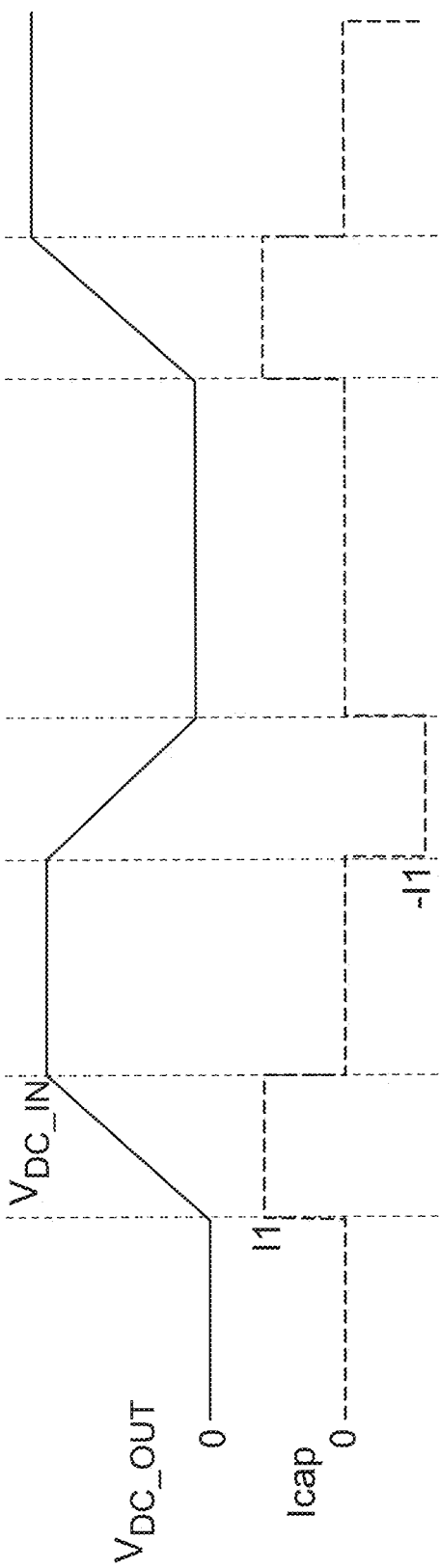
FIG. 6 depicts an illustrative timing diagram during a heat generation mode of a DC-DC converter, in accordance with some embodiments of the disclosure.

As shown in FIG. 6, depicting an illustrative timing diagram 600 during the heat generation mode of DC-DC converter 114, control circuitry 112 may cause output voltage $V_{DC\_OUT}$ of DC-DC converter 114 to be ramped up and ramped down, thus charging and discharging an output capacitor bank (e.g., comprising capacitor C2 and/or other energy-storage elements), and the pulsating output voltage may be used to induce losses in components of DC-DC converter 114, e.g., by ramping the output voltage up and down at any suitable rate (e.g., once per second, ten times per second, such as in a relatively slow manner to increase losses incurred. For example, capacitor C2 may be charged to the voltage level of input voltage $V_{DC\_IN}$ of DC-DC converter 114 after a finite period of time, based on a time constant of capacitor C2. When voltage across capacitor C2 is constant, capacitor C2 cannot discharge, and the energy absorbed by capacitor C2 remains stored therein. Based on varying the voltage across capacitor C2 over time (e.g., by controlling switches of primary side bridge 220 and/or secondary side bridge 222 to control the current flowing out of secondary side bridge 222 and into capacitor C2), energy may be periodically discharged from capacitor C2 via current flow Icap through a resistor or any other suitable portion of the circuit. For example, such current flowing out of secondary side bridge 222 can be positive or negative, thus charging or discharging the capacitor, respectively. In some embodiments, in addition to utilizing capacitor C2 to generate losses in the no-load operational state, control circuitry may employ intra-bridge phase shifting (e.g., within either primary side bridge 220 or secondary side bridge 222 of DC-DC converter 114) to adjust the generated losses. In some embodiments, such charging and discharging of capacitor C2 and/or other suitable energy-storage elements may be performed simultaneously amongst multiple PEMs and/or sequentially by multiple PEMs.

FIGS. 7A-7C are illustrative block diagrams showing additional details of some components of power cabinet 106, in accordance with some embodiments of the disclosure. As shown in FIG. 7A, circuitry 700 may comprise any suitable number of PEMs, e.g., PEM 701 . . . PEM 703 (PEM N), where PEM 701 may comprise bidirectional AC-DC converter 704 and bidirectional DC-DC converter 706, and PEM 703 may comprise bidirectional AC-DC converter 708 and bidirectional DC-DC converter 710. In some embodiments, PEM 101 of FIG. 1 may be implemented as PEM 701, and AC-DC converter 116 and DC-DC converter 114 of FIG. 1 may be implemented as bidirectional AC-DC converter 704 and bidirectional DC-DC converter 706, respectively. In some embodiments, PEM 103 and any subsequent PEMs of FIG. 1 may be implemented as PEM 703, and an AC-DC converter and a DC-DC converter (not shown) of such PEM(s) may be implemented as bidirectional AC-DC converter 708 and bidirectional DC-DC converter 710, respectively. In some embodiments, at least one of DC-DC converter 706 or DC-DC converter 710 may be a DAB converter, a CLLC DC-DC converter, or any other suitable DC-DC converter, or any combination thereof.

As shown in FIG. 7A, each of bidirectional AC-DC converter 704 and bidirectional DC-DC converter 706 of PEM 701 may be coupled to DC link 712, and each of bidirectional AC-DC converter 708 and bidirectional DC-DC converter 710 of PEM 703 may be coupled to DC link 712, which may be separate and distinct from DC link 714. PEM 701 . . . 703, and the components thereof, may be configured to be capable of bidirectional power flow to enable power to be passed in either direction (e.g., to and from power grid 108, which may provide AC electrical power 702, such as in the form of a three-phase 480 V 60 Hz signal, and/or to and from DC link 712 and/or DC link 714). Such bidirectional characteristic may be leveraged to circulate current between bidirectional PEMs 701 . . . 703 to induce ude losses. In some embodiments, power grid 108 may comprise a 3-phase AC source configured to only supply enough current to supply the power losses in the system. In some embodiments, the example of FIG. 7A may be implemented in a no-load operational state. In some embodiments, PEMs 701 . . . 703 may be connected in parallel.

In the example of FIG. 7B, circuitry 716, which may be implemented in a similar manner as discussed in connection with circuitry 700 of FIG. 7A, may comprise PEM 718, PEM 720 . . . and PEM 722 (PEM N). PEM 718 may be configured to be a master PEM, PEM 720 and/or PEM 722 may be configured to be slave PEM(s), and/or N other suitable PEM(s) may be configured to be a slave PEM. In some embodiments, the master and slave PEMs may be connected in parallel. Based on the aforementioned bidirectional power flow capability of PEM 701, 703 . . . and PEM N, control circuitry 112 may cause current (and thus power flow) to circulate between master PEM 718, slave PEM 720 and/or slave PEM 722, e.g., in a no-load operational state, to induce losses. For example, two or more PEMS may be connected at their outputs, and master PEM 718 may be configured to control output voltage Vout and drive the slave PEMs to generate heat. In some embodiments, each of the one or more slave PEMs 720 . . . 722 may be configured to draw current from output voltage Vout, and return such current to power grid 108. In some embodiments, master PEM 718 may be configured to control output voltage Vout by generating an equal and opposite output current with respect to slave PEM(s) 720 . . . 722. In some embodiments, AC electrical power 108 may be configured to only supply enough current to supply the power losses in the system. In some embodiments, two PEMs may be connected to each of three different dispenser outputs.

In the example of FIG. 7C, circuitry 724 may comprise one or more AC-DC converters, e.g., AC-DC converter 726 and AC-DC converter 728, and one or more DC-DC converters, e.g., DC-DC converter 730 and DC-DC converter 732. In some embodiments, any suitable number of AC-DC converter(s) may be employed in circuitry 724, and any suitable number DC-DC converter(s) may be employed in circuitry 724, where the number of AC-DC converter(s) may be equal to the number of DC-DC converter(s) or there may be an unequal amount of AC-DC converter(s) and DC-DC converter(s). In some embodiments, AC-DC converter 726 and AC-DC converter 728 may be coupled by way of common DC link 734, and/or DC-DC converter 730 and DC-DC converter 732 may be coupled by way of common DC link 734. Control circuitry 112 may be configured to cause current to be circulated between only AC-DC converters 726 and 728 (such as shown by the arrow on the left-hand portion of FIG. 7C), or may be configured to cause current to be circulated between only DC-DC converters 730 and 732 (such as shown by the arrow on the right-hand portion of FIG. 7C), in generating losses, or may be configured to cause current to be circulated between AC-DC converters 726 and 728 and DC-DC converters 730 and 732, in generating losses. In some embodiments, at least one of DC-DC converter 730 or 732 may be a DAB DC-DC converter. In some embodiments, a master-slave arrangement may be utilized in connection with the implementation of FIG. 7C, with respect to the DC-DC converters and/or AC-DC converters. In some embodiments, at least two of the DC-DC converters may be connected in parallel for increased power processing and/or common DC link voltage 734 may be employed. In some embodiments, AC-DC converter 726 and AC-DC converter 728 may have outputs thereof tied to a common DC bus to enable multiple DC-DC converters (e.g., DC-DC converter 730 and 732, and/or any other suitable DC-DC converters) to have their inputs connected to the same common DC bus. In some embodiments, the example of FIG. 7C may be utilized in connection with a no-load operational state.

Figure 8:
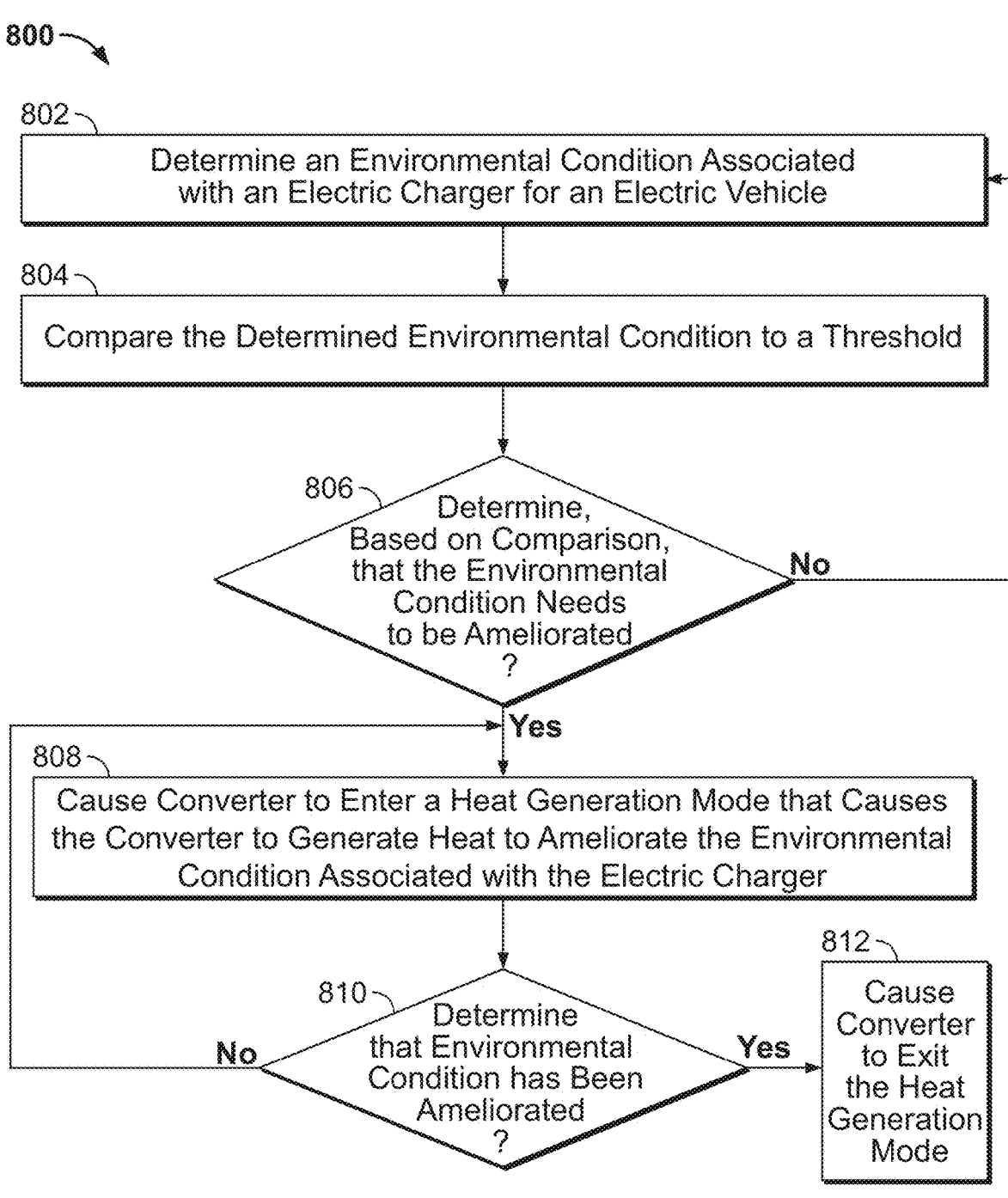
FIG. 8 depicts an illustrative flowchart of a process for controlling a DC-DC converter to ameliorate an environmental condition associated with an electric charger for an electric vehicle, in accordance with some embodiments of the disclosure.

FIG. 8 depicts an illustrative flowchart of a process 800 for controlling a dual active bridge converter to ameliorate an environmental condition associated with an electric charger for an electric vehicle, in accordance with some embodiments of the disclosure. At 802, control circuitry 112 may determine an environmental condition associated with an electric charger (e.g., at least a portion of power cabinet 106 and/or at least a portion of DCFC dispenser 104 configured to charge battery 120 via a charging port of electric vehicle 102 of FIG. 1). For example, control circuitry 112 and/or PEM controller 121 may determine a temperature or humidity (based on signals received from temperature sensor 122 and humidity sensor 124, respectively) associated with power cabinet 106 (and/or any components thereof) and/or DCFC dispenser 104. Control circuitry 112 may periodically transmit a request to temperature sensor 122 and/or humidity sensor 124 to obtain a current measurement, e.g., according to a predefined schedule, and/or in response to certain triggers (e.g., determining weather or other environmental conditions of a location of power cabinet 106 meet certain criteria), or otherwise receive such measurements.

At 804, control circuitry 112 may compare the environmental condition determined at 802 with a threshold, e.g., stored at storage 110. For example, storage 110 may store a threshold temperature value (e.g., −20 degrees Celsius and/ or any other suitable value(s)) and/or a threshold humidity value (e.g., 90% and/or any other suitable value(s)) to which the current environmental condition should be compared. In some embodiments, different thresholds for particular environmental conditions may be stored for different types of electric chargers (e.g., DC Fast chargers may be stored in association with the same or different thresholds as a different type of electric charger).

At 806, control circuitry 112 may determine, based on comparison, whether the environmental condition needs to be ameliorated. For example, control circuitry 112 and/or PEM controller 121 may determine that the environmental condition needs to be ameliorated if the temperature is at or below the associated threshold temperature value stored at storage 110, and/or if the temperature is at or above the associated threshold humidity value stored at storage 110, which may be retrieved or referenced at 804. In response to an affirmative determination at 806, processing may proceed to 808; otherwise processing may return to 802. For example, storage 110 may store a threshold temperature value (e.g., −20 degrees Celsius and/or any other suitable value(s)) and/or a threshold humidity value (e.g., 90% and/or any other suitable value(s)) to which the current environmental condition should be compared. Control circuitry 112 may determine that the ambient temperature of power cabinet 106 and/or a particular PEM is below −20 degrees Celsius, and/or control circuitry 112 may determine that the relative humidity of power cabinet 106 and/or a particular PEM is above 90%.

At 808, control circuitry 112 may cause DC-DC converter 114 enter a heat generation mode that causes DC-DC converter 114 to generate heat to ameliorate the environmental condition associated with the electric charger (e.g., at least a portion of power cabinet 106 and/or at least a portion of DCFC dispenser 104 of FIG. 1). For example, upon determining the ambient temperature of power cabinet 106 and/or a particular PEM is below the −20 degrees Celsius threshold, control circuitry 112 may cause the heat generation mode to be employed until control circuitry 112 determines (e.g., at 810) that the ambient temperature of power cabinet 106 and/or a particular PEM has increased to a particular stored value (e.g., −10 degrees Celsius or any other suitable value) or at least has increased to a value above the threshold, and therefore that the environmental condition has been ameliorated. As another example, upon determining the relative humidity of power cabinet 106 and/or a particular PEM is above 90%, control circuitry 112 may cause the heat generation mode to be employed (e.g., including causing fan 126 to be turned on or stirred) until control circuitry 112 may determine (e.g., at 810) that the relative humidity of power cabinet 106 and/or a particular PEM has decreased to a particular stored value (e.g., 80%) or at least has decreased to a value below the threshold, and therefore that the environmental condition has been ameliorated.

Control circuitry 112 may execute the heat generation mode using one or more of a variety of techniques. For example, control circuitry 112 and/or PEM controller 121 may be configured to cause DC-DC converter 114 to enter the heat generation mode by creating a shorted output (e.g., by turning on each of S1*s*, S2*s*, S3*s*, and S4*s* of secondary side bridge 222; or by turning on only upper switches S1*s* and S2*s*, or only lower switches S3*s*, and S4*s*, from among S1*s*, S2*s*, S3*s*, and S4*s* of secondary side bridge 222). As another example, control circuitry 112 and/or PEM controller 121 may cause DC-DC converter 114 (in a no-load operational state) to enter the heat generation mode by periodically charging and discharging capacitor C2 (or one or more of any other suitable energy-storage elements) coupled to secondary side bridge to 222 to cause energy to be stored by and released from capacitor C2 and/or the one or more other suitable energy-storage elements, as shown in FIG. 6.

Additionally or alternatively, control circuitry 112 may execute the heat generation mode using any of the examples discussed in connection with FIGS. 7A-7C. For example, as shown in FIG. 7A, control circuitry 112 may induce losses by causing current to circulate in circuitry 700 in which separate DC links 712, 714 are connected to PEM 701 and PEM 703, each of which may comprise bidirectional AC-DC converters and bidirectional DC-DC converters. In some embodiments, a master-slave technique may be employed with respect to circuitry 700, as discussed in connection with FIG. 7B. As another example, control circuitry 112 may execute the heat generation mode using the arrangement of circuitry 724 discussed in connection with FIG. 7C. For example, control circuitry 112 may induce losses by causing current to circulate between only AC-DC converters 726 and 728, or may be configured to cause current to be circulated between only DC-DC converters 730 and 732, in generating losses, or may be configured to cause current to be circulated between AC-DC converters 726 and 728 and DC-DC converters 730 and 732, in generating losses.

At 812, control circuitry 112 may cause DC-DC converter 114 to exit the heat generation mode upon determining (at 810) that the environment condition has been ameliorated. On the other hand, processing may return to 808 if control circuitry 112 determines that the environmental condition has not yet been ameliorated (e.g., the temperature value associated with power cabinet 106 has not yet increased above the threshold value), and the heat generation mode is continued. In some embodiments, after control circuitry 112 causes DC-DC converter 114 to exit the heat generation mode, processing may return to 802 to continue to monitor power cabinet 106 for environmental conditions which should be ameliorated via the heat generation mode. In some embodiments, the heat generation mode may simultaneously be used to ameliorate multiple environment conditions simultaneously, e.g., to increase the temperature as well as decrease humidity of power cabinet 106 simultaneously.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
determining an environmental condition associated with an electric charger for an electric vehicle, wherein the electric charger comprises a dual active bridge converter, and wherein determining the environmental condition comprises determining that a temperature associated with the electric charger is below a threshold temperature; and
in response to determining that the temperature associated with the electric charger is below the threshold temperature, causing the dual active bridge converter to enter a heat generation mode that causes the dual active bridge converter to generate heat to increase the temperature and ameliorate the environmental condition associated with the electric charger.

2. The method of claim 1, further comprising:
causing the dual active bridge converter to exit the heat generation mode based on determining that, as a result of the heat generation mode, the temperature associated with the electric charger has increased to a particular temperature value greater than the threshold temperature.

3. The method of claim 1, wherein:
the environmental condition further comprises a humidity associated with the electric charger;
causing the dual active bridge converter to enter the heat generation mode based on the environmental condition associated with the electric charger further comprises determining that the humidity associated with the electric charger is above a threshold humidity;
the heat generation mode further comprises causing a fan to circulate air; and
the method further comprises causing the dual active bridge converter to exit the heat generation mode based on determining the humidity associated with the electric charger has decreased to a particular humidity value lower than the threshold humidity.

4. The method of claim 1, wherein:
the dual active bridge converter comprises a transformer, a primary side bridge comprising a first plurality of switches, and a secondary side bridge comprising a second plurality of switches; and
causing the dual active bridge converter to enter the heat generation mode comprises:
creating a shorted output by turning on each of the second plurality of switches of the secondary side bridge; and
controlling a current flowing through the primary side bridge and the transformer based on performing phase shift control of the first plurality of switches of the primary side bridge.

5. The method of claim 1, wherein:
the dual active bridge converter comprises a transformer, a primary side bridge comprising a first plurality of switches, and a secondary side bridge comprising a second plurality of switches; and
causing the dual active bridge converter to enter the heat generation mode comprises:
creating a shorted output by turning on a subset of the second plurality of switches corresponding to upper switches of the secondary side bridge or by turning on a subset of the second plurality of switches corresponding to lower switches of the secondary side bridge; and causing a current to flow through the primary side bridge and the transformer based on performing phase shift control of the first plurality of switches of the primary side bridge.

6. The method of claim 1, wherein:
the dual active bridge converter comprises a transformer, a primary side bridge, and a secondary side bridge;
in the heat generation mode, the dual active bridge converter is in a no-load operational state; and
causing the dual active bridge converter to enter the heat generation mode comprises periodically charging and discharging a capacitor coupled to the secondary side bridge to cause energy to be stored by and released from the capacitor.

7. The method of claim 1, wherein the dual active bridge converter is caused to enter the heat generation mode when no electric vehicles are being charged by the electric charger or when at least one electric vehicle is being charged by the electric charger.

8. A system comprising:
a dual active bridge converter;
control circuitry configured to:
    determine an environmental condition associated with an electric charger for an electric vehicle by determining that a temperature associated with the electric charger is below a threshold temperature, wherein the electric charger comprises the dual active bridge converter; and
    in response to determining that the temperature associated with the electric charger is below the threshold temperature, cause the dual active bridge converter to enter a heat generation mode that causes the dual active bridge converter to generate heat to increase the temperature and ameliorate the environmental condition associated with the electric charger.

9. The system of claim 8, wherein the control circuitry is further configured to:
cause the dual active bridge converter to exit the heat generation mode based on determining that, as a result of the heat generation mode, the temperature associated with the electric charger has increased to a particular temperature value greater than the threshold temperature.

10. The system of claim 8, wherein the environmental condition comprises a humidity associated with the electric charger, and the control circuitry is further configured to:
cause the dual active bridge converter to enter the heat generation mode based on the environmental condition associated with the electric charger further by determining that the humidity associated with the electric charger is above a threshold humidity;
cause the heat generation mode to further comprise causing a fan to circulate air; and
cause the dual active bridge converter to exit the heat generation mode further based on determining the humidity associated with the electric charger has decreased to a particular humidity value lower than the threshold humidity.

11. The system of claim 8, wherein the dual active bridge converter comprises a transformer, a primary side bridge comprising a first plurality of switches, and a secondary side bridge comprising a second plurality of switches, and the control circuitry is configured to cause the dual active bridge converter to enter the heat generation mode by:
creating a shorted output by turning on each of the second plurality of switches of the secondary side bridge; and controlling a current flowing through the primary side bridge and the transformer based on performing phase shift control of the first plurality of switches of the primary side bridge.

12. The system of claim 8, wherein the dual active bridge converter comprises a transformer, a primary side bridge comprising a first plurality of switches, and a secondary side bridge comprising a second plurality of switches, and the control circuitry is configured to cause the dual active bridge converter to enter the heat generation mode by:
creating a shorted output by turning on a subset of the second plurality of switches corresponding to upper switches of the secondary side bridge or by turning on a subset of the second plurality of switches corresponding to lower switches of the secondary side bridge; and
causing a current to flow through the primary side bridge and the transformer based on performing phase shift control of the first plurality of switches of the primary side bridge.

13. The system of claim 8, wherein:
the dual active bridge converter comprises a transformer, a primary side bridge, and a secondary side bridge; and
in the heat generation mode, the dual active bridge converter is in a no-load operational state, and the control circuitry is configured to cause the dual active bridge converter to enter the heat generation mode by periodically charging and discharging a capacitor coupled to the secondary side bridge to cause energy to be stored by and released from the capacitor.

14. The system of claim 8, wherein the dual active bridge converter is caused to enter the heat generation mode when no electric vehicles are being charged by the electric charger or when at least one electric vehicle is being charged by the electric charger.

15. A system comprising:
a first bidirectional converter capable of bidirectional power flow;
a second bidirectional converter capable of bidirectional power flow;
control circuitry configured to:
    determine an environmental condition associated with an electric charger for an electric vehicle, wherein the electric charger comprises the first bidirectional converter and the second bidirectional converter; and
    based on the environmental condition associated with the electric charger, cause the first bidirectional converter and the second bidirectional converter to enter a heat generation mode that:
    causes the first bidirectional converter and the second bidirectional converter to generate heat to ameliorate the environmental condition associated with the electric charger by causing current to circulate between the first bidirectional converter and the second bidirectional converter.

16. The system of claim 15, wherein at least one of the first bidirectional converter or the second bidirectional converter is a dual active bridge DC-DC converter, and the control circuitry is further configured to cause the first bidirectional converter and the second bidirectional converter to exit the heat generation mode in response to determining that the environmental condition has been ameliorated.

17. The system of claim 15, wherein:
the system further comprises a first power electronics module and a second power electronics module;
each of the first bidirectional converter and the second bidirectional converter is a DC-DC converter;

the first power electronics module comprises the first bidirectional converter and a first AC-DC converter, and the second power electronics module comprises the second bidirectional converter and a second AC-DC converter, each of the first AC-DC converter and the second AC-DC converter being capable of bidirectional power flow;

each of the first bidirectional converter and the first AC-DC converter is coupled to a first DC link; and each of the second bidirectional converter and the second AC-DC converter is coupled to a second DC link distinct from the first DC link.

18. The system of claim 15, wherein:

the first bidirectional converter is an AC-DC converter, and the second bidirectional converter is an AC-DC converter;

each of the first bidirectional converter and the second bidirectional converter is coupled to a common DC link and an AC source.

19. The system of claim 15, wherein:

the first bidirectional converter is an DC-DC converter, and the second bidirectional converter is an DC-DC converter;

each of the first bidirectional converter and the second bidirectional converter is coupled to a common DC link.

20. The system of claim 15, wherein:

the system further comprises a first power electronics module comprising the first bidirectional converter and a second power electronics module comprising the second bidirectional converter;

the first power electronics module and the second power electronics module are connected in parallel;

the first power electronics module is configured to be a master power electronics module that controls an output of the parallel connection;

the second power electronics module is configured to be a slave power electronics module configured to draw a current from the output and return the current to an electrical power grid; and the first power electronics module is configured to control the output of the parallel connection by generating an equal and opposite output current to the current drawn by the second power electronics module.

* * * * *